(12) United States Patent
Goodell

(10) Patent No.: US 6,318,813 B1
(45) Date of Patent: Nov. 20, 2001

(54) AIR SPRING RESERVOIR EMERGENCY BRAKE BACKUP SYSTEM

(75) Inventor: David J. Goodell, Beaverton, OR (US)

(73) Assignee: Honeywell Commercial Vehicle Systems Co., Elyria, OH (US)

( * ) Notice: Subject to any disclaimer, the term of this patent is extended or adjusted under 35 U.S.C. 154(b) by 0 days.

(21) Appl. No.: 09/488,247

(22) Filed: Jan. 20, 2000

(51) Int. Cl.[7] .................................................. B60T 11/34
(52) U.S. Cl. ............... 303/85; 280/124.16; 280/124.157; 280/5.503
(58) Field of Search ................... 303/85, 3, 15, 303/9, 9.76, 7; 188/195; 267/122; 280/124.16, 24.161, 124.157, 5.5, 5.503

(56) References Cited

U.S. PATENT DOCUMENTS

| | | | |
|---|---|---|---|
| Re. 29,096 | * | 1/1977 | Jones ...................................... 303/100 |
| 2,942,917 | * | 6/1960 | Swander, Jr. ............................... 303/5 |
| 4,265,489 | * | 5/1981 | Meinicke .................................. 303/3 |
| 4,453,777 | * | 6/1984 | Newton ..................................... 303/2 |
| 4,585,279 | * | 4/1986 | Doto .................................... 303/22 R |
| 4,743,073 | * | 5/1988 | Gruenberg ............................. 303/92 |
| 5,327,346 | * | 7/1994 | Goodell ........................... 364/426.02 |
| 5,738,417 | * | 4/1998 | Wood et al. .............................. 303/7 |
| 5,788,339 | * | 8/1998 | Wood et al. .............................. 303/7 |
| 6,149,246 | * | 11/2000 | Terborn et al. .......................... 303/7 |

* cited by examiner

Primary Examiner—Robert J. Oberleitner
Assistant Examiner—Xuan Lan Nguyen

(57) ABSTRACT

An emergency brake backup system is achieved by selectively interconnecting the air suspension as an additional reservoir to the air brake system. That is, if the charging system or primary reservoir fails, compressed air in the air spring reservoirs is used as an energy source to supply the pressurized air required for brake function. This can be achieved with minor modification to existing tractor and trailer brake systems that employ air suspension assemblies.

13 Claims, 2 Drawing Sheets

AIR SPRING RESERVOIR EMERGENCY BRAKE BACKUP SYSTEM

BACKGROUND OF THE INVENTION

1. Field of the Invention

This application relates to a heavy vehicle or truck brake system, and more particularly to a low cost compressed air backup system should difficulties be encountered with the primary compressed air reservoir and/or charging system.

2. Discussion of the Art

Conventionally, heavy vehicles or trucks use compressed air for their braking needs. A compressor charges primary and secondary reservoirs. A control valve, such as a foot control valve, regulates the application of the pressurized air from reservoirs to brake chambers associated with the vehicle wheels to effect braking.

As will be appreciated, the secondary reservoir provides a desired redundancy or backup in case the primary reservoir fails or becomes functionally inoperative, or the charging system fails in a manner well know in the art. The secondary reservoir provides a first level of redundancy or backup operation of the air brakes if the primary reservoir fails.

Although not required by regulation, an additional emergency backup system is always desirable. This is particularly true if such a system can be incorporated into the system at low cost and without substantial modification to existing designs.

SUMMARY OF THE INVENTION

The present invention provides an emergency backup system or secondary/tertiary compressed air reservoir for heavy vehicle brake systems.

An exemplary embodiment of the invention used in association with a vehicle air brake system includes at least one air actuated brake assembly. A primary reservoir provides pressurized air for the brake system. A suspension assembly includes an air spring reservoir for supporting at least a portion of the vehicle load. A valve assembly is interconnected with the primary reservoir and the suspension assembly for selectively connecting an air spring reservoir of the suspension assembly to the brake in response to malfunction of the primary reservoir or charging system.

According to another aspect of the invention, the valve assembly is preferably a check valve that isolates the brake assembly from the air spring reservoir and communicates with the primary reservoir during normal operation. If the primary reservoir or charging system malfunctions or fails, the brake assembly is then isolated from the primary reservoir and communicates with the air spring reservoir.

The backup assembly incorporates at least one check valve into the existing tractor brake system components, and two check valves if used in association with a trailer braking system, in conjunction with additional air lines or plumbing.

A primary advantage of the invention resides in the additional backup in response to failure of the primary reservoir or charging system.

Another advantage of the invention resides in the low cost associated with incorporating the backup reservoir into initial manufacture or after-market conversion of an existing brake system.

Still another advantage is the enhanced safety offered by the backup system.

Still other advantages and benefits of the invention will become apparent to those skilled in the art upon review of the following specification.

BRIEF DESCRIPTION OF THE DRAWINGS

The invention may take physical form in certain parts and arrangements of parts, the preferred embodiments of which are described in this specification and illustrated in the accompanying drawings.

DETAILED DESCRIPTION OF THE PREFERRED EMBODIMENTS

Figure 1:
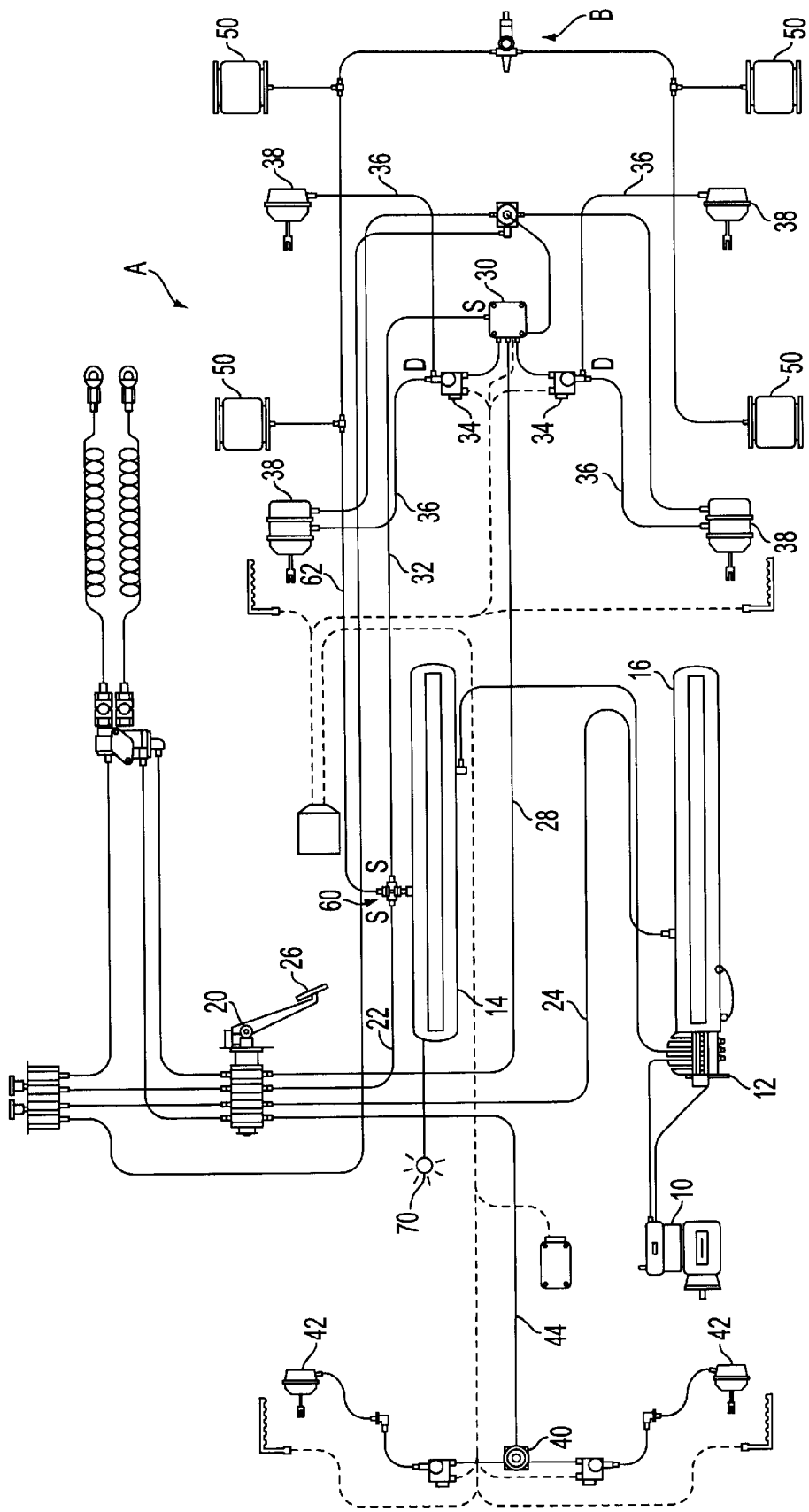
FIG. 1 is a schematic representation of a truck brake system, particularly of the tractor portion thereof, incorporating the present invention.

A tractor truck brake system is shown in FIG. 1 and generally referenced by numeral A. The air brake system associated with the tractor includes a charging system, such as compressor 10, that supplies compressed air to an air dryer 12. The air dryer removes moisture and/or oil vapor from the compressed air which is subsequently stored in a primary reservoir 14 and a secondary reservoir 16.

Both of the reservoirs communicate with a control valve, such as foot control valve 20, through lines or passages 22, 24, respectively. In response to depressing the foot control valve via pedal 26, compressed air may be supplied through line 28 and selectively supply a control signal to a relay valve 30 in communication with supply pressure from the primary reservoir via line 32. The relay valve cooperates with a pair of modulator valves 34 of a conventional ABS brake system so that delivery of pressurized air is provided through lines 36 to brake chambers 38 associated with the rear wheels. The schematic brake circuit illustrated in FIG. 1 includes an anti-lock brake system (ABS), the details of which are conventional in the art and are not unique to the present invention so that further discussion herein is deemed unnecessary. In addition, a quick release valve 40 communicates with the front axle wheels. The quick release valve distributes compressed air to brake chambers 42 associated with each of the front wheels (not shown) received through line 44 extending from the foot control valve.

The weight or load carried by the tractor is at least in part borne on and distributed by an air suspension assembly B. The air suspension assembly includes air springs 50 (four air springs illustrated in FIG. 1) which are pressurized via the charging system and reservoir assemblies of the tractor. The air springs are located at preselected, spaced regions on the tractor to distribute the weight or load to the drive and tag axles. To this point, the detailed description is generally applicable to any conventional truck brake system employing an air suspension assembly.

The present invention incorporates an emergency backup system by interconnecting the air suspension assembly with the brake system. More particularly, each air spring 50 defines an air spring reservoir. The combined volume of the individual air spring reservoirs can total up to two thousand four hundred (2400) cubic inches. If the charging system or primary reservoir malfunctions or fails, the air spring reservoirs can be used as an emergency backup energy source or tertiary supply of compressed air to supply brake needs.

Advantageously, this additional backup is obtained with only minor modification to the existing system. For example, valve 60 is provided in the supply lines 22, 32 leading from the primary reservoir to the foot control valve 20 and relay valve 30, respectively. In the preferred arrangement, the valve is a double-check valve that communicates with newly added line 62 that leads to each of the air spring reservoirs. The double-check valve 60 operates so that the air suspension assembly, i.e., the air spring reservoirs, is isolated or precluded from communicating with the foot control valve, relay valve, and brake chambers of the brake system if the primary reservoir and charging system are active and functional. If operative, the primary reservoir provides the compressed air needed for brake function of the brake system A.

On the other hand, if the charging system and primary reservoir are unable to meet the air brake demands, the double-check valve will move to a second position which isolates or precludes communication between the reservoir and the foot control valve 20 and relay valve 30. Instead, the compressed air in the air spring reservoirs 50 will communicate through lines 62 to the double-check valve, and then through line 32 to supply compressed air to the relay valve. Supply air is also advantageously provided to the foot control valve through line 22 so that a control signal through line 28 still operates the brakes using the air spring reservoir as a source of compressed air in an emergency backup system.

The double-check valve shuttles to protect the air spring reservoir and supplies pressurized air to the drive axle relays and the foot control valve. This maintains limited pressure brake capability at all axles. Simultaneously, the driver or operator can be warned that the pressure was depleted in the primary reservoir via a low pressure indicator 70.

If the vehicle were to be equipped with a charging system that uses pressure protection valves instead of check valves, the charging system would continue to charge the secondary reservoir and air suspension circuit. This would allow extended use of the vehicle with all axle brakes at limited pressure. The air spring reservoir pressure, being directly related to or a function of vehicle weight, would therefore advantageously provide higher braking pressures when needed as the vehicle weight increases.

Figure 2:
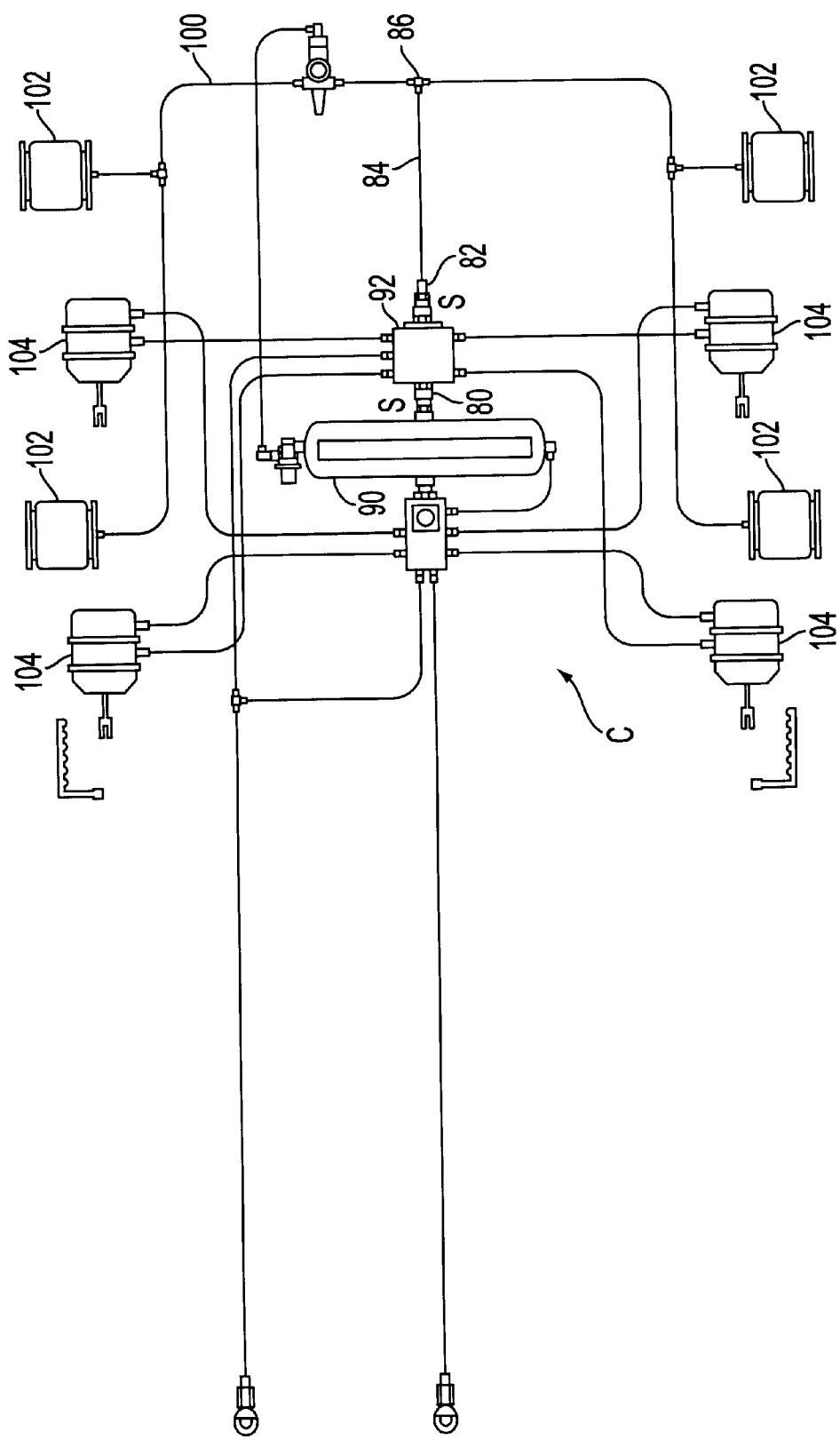
FIG. 2 is a schematic view of the emergency backup system of the present invention incorporated in a trailer brake system.

FIG. 2 illustrates an adaptation of the concept to a trailer brake system C. In this arrangement, a pair of single check valves 80, 82 are added along with line 84 and fitting 86. The first check valve 80 is interposed between reservoir 90 and an ABS modulating valve 92 that communicates with the trailer brakes. In addition, the second single check valve 82, along with the associated line 84, are interconnected with the air suspension assembly. Common line 100 communicates with each air spring reservoir 102. In the event of a trailer reservoir or charging system failure, the anti-lock module 92 is supplied compressed air from the air springs. The check valve 80 between the reservoir and the modulating valve 92 protects the air spring reservoirs from draining out the failed reservoir.

In the event of an air suspension failure, the check valve 82 located between the air suspension system and the modulating valve protects the trailer reservoir 90. Thus, desired air pressure is provided to the brake chambers 104 associated with the wheels of the trailer either from the trailer reservoir or, in an emergency or backup mode, from the trailer air suspension assembly.

Enhanced redundancy could lead to increased safety in air brake vehicles by using the air spring suspensions to effectively create an additional backup reservoir for use in the event of a primary reservoir or trailer system reservoir failure. Existing heavy vehicle hardware, i.e., the conventional brake system and suspension air springs, can be easily modified to selectively use the combined volume of the air springs to create a low cost backup reservoir. The system is cost effective in that it requires one additional (high capacity) double-check valve and minor plumbing modifications to implement on typical tractors. In trailers, the system would require two additional single check valves and additional plumbing hardware.

The invention has been described with reference to the preferred embodiment. Modifications and alterations will occur to others upon a reading and understanding of the present specification. The invention is intended to include all such modifications and alterations insofar as they come within the scope of the appended claims or the equivalents thereof.

Having thus described the invention, it is now claimed:

1. A backup assembly for a vehicle air brake
   at least one air actuated brake assembly;
   a reservoir providing pressurized air for the brake assembly;
   a suspension assembly having an air spring reservoir for supporting at least a portion of a load imposed on the vehicle; and
   a valve assembly operatively associated with the reservoir and the suspension assembly for connecting the air spring reservoir to the brake assembly in response to failure of the reservoir, wherein said valve assembly includes a check valve interposed between the reservoir and the air spring reservoir, and said check valve is a double check valve that shuttles between first and second positions, in the first position the brake assembly is isolated from the air spring reservoir and in communication with the reservoir, and in the second position the brake assembly is isolated from the reservoir and in communication with the air spring reservoir.

2. The backup assembly of claim 1 further comprising an air line interconnecting the reservoir with the air spring reservoir and the valve assembly being disposed in the air line.

3. The backup assembly of claim 1 further comprising a low pressure indicator operatively associated with the reservoir that provides a signal to a vehicle operator of a malfunction associated with the reservoir.

4. The backup assembly of claim 1 further comprising a trailer brake system including a trailer reservoir that supplies compressed air to wheel brakes and a line interconnecting a trailer air suspension assembly with the trailer brake system.

5. The backup assembly of claim 4 wherein the trailer brake system includes a modulating valve controlling application of compressed air to the wheel brakes and a first check valve interposed between the trailer reservoir and the modulating valve to prevent the trailer air suspension assembly from being depleted through a malfunctioning trailer reservoir.

6. The backup assembly of claim 5 further comprising a second check valve interposed between the modulating valve and the air suspension assembly to protect the trailer reservoir from being depleted through a failed air suspension assembly.

7. The backup assembly of claim 4 further comprising a check valve interposed between the modulating valve and the air suspension assembly to protect the trailer reservoir from being depleted through a failed air suspension assembly.

8. A backup assembly for a heavy vehicle air brake system comprising:
   an air brake assembly including a primary reservoir providing pressurized air for the brake assembly;
   a suspension assembly having an air spring reservoir for supporting a load imposed on the vehicle;

an air line interconnecting the air brake assembly with the air spring reservoir; and a check valve assembly provided in the air line and in operatively association with the air brake assembly and the suspension assembly for connecting the air spring reservoir to the brake assembly in response to failure of the primary reservoir, a trailer brake system including a trailer reservoir that supplies compressed air to wheel brakes and a line interconnecting a trailer air suspension assembly with the trailer brake system having a check valve assembly therein that allows compressed air in the trailer suspension assembly to be used for operating the trailer brake system if the trailer reservoir malfunctions, said trailer brake system including a modulating valve controlling application of compressed air to the wheel brakes and the check valve assembly including a first check valve interposed between the trailer reservoir and the modulating valve to prevent the trailer air suspension assembly from being depleted through a malfunctioning trailer reservoir.

9. The backup assembly of claim 8 further comprising a low pressure indicator operatively associated with the primary reservoir that provides a signal to a vehicle operator of a malfunction associated with the reservoir.

10. The backup assembly of claim 8 wherein the check valve assembly further comprises a second check valve interposed between the modulating valve and the air suspension assembly to protect the trailer reservoir from being depleted through a failed air suspension assembly.

11. A backup assembly for a vehicle air brake system comprising:

at least one air actuated brake assembly;

a reservoir providing pressurized air for the brake assembly;

a suspension assembly having an air spring reservoir for supporting at least a portion of a load imposed on the vehicle; and a valve assembly operatively associated with the reservoir and the suspension assembly for connecting the air spring reservoir to the brake assembly in response to failure of the reservoir, a trailer brake system including a trailer reservoir that supplies compressed air to wheel brakes and a line interconnecting a trailer air suspension assembly with the trailer brake system, a modulating valve controlling application of compressed air to the wheel brakes, and a first check valve interposed between the trailer reservoir and the modulating valve to prevent the trailer air suspension assembly from being depleted through a malfunctioning trailer reservoir.

12. The backup assembly of claim 11 further comprising a second check valve interposed between the modulating valve and the air suspension assembly to protect the trailer reservoir from being depleted through a failed air suspension assembly.

13. The backup assembly of claim 11 further comprising a check valve interposed between the modulating valve and the air suspension assembly to protect the trailer reservoir from being depleted through a failed air suspension assembly.

* * * * *